United States Patent [19]

Theurer

[11] 4,384,530

[45] May 24, 1983

[54] ON-TRACK, OFF-TRACK TRACK MAINTENANCE MACHINE

[75] Inventor: Josef Theurer, Vienna, Austria

[73] Assignee: Franz Plasser Bahnbaumas-Chinen-Industriegesellschaft m.b.H., Vienna, Austria

[21] Appl. No.: 266,694

[22] Filed: May 26, 1981

[30] Foreign Application Priority Data

Jun. 27, 1980 [AT] Austria ................................ 3392/80

[51] Int. Cl.³ ........................ B60F 1/04; B62D 27/00; E01B 29/04; E01B 27/06
[52] U.S. Cl. .................................... 104/7 R; 104/12; 105/26 D; 105/215 C; 280/81 R
[58] Field of Search ................... 105/215 C, 75, 26 D, 105/26.1, 90 A; 104/12, 7 R, 7 A, 7 B, 2, 8, 9; 180/139; 280/81 R, 9, 11, 43.24; 414/685

[56] References Cited

U.S. PATENT DOCUMENTS 3,022,744 2/1962 Jackson .......................... 105/215 C
3,501,040 3/1970 Martelee .............................. 105/75
4,103,622 8/1978 Theurer .............................. 104/7 R

FOREIGN PATENT DOCUMENTS 2554463 6/1977 Fed. Rep. of Germany ... 105/215 C

Primary Examiner—Randolph Reese
Assistant Examiner—Richard Mathieu
Attorney, Agent, or Firm—Kurt Kelman

[57] ABSTRACT

An on-track, off track track maintenance machine comprises a first machine frame, undercarriages for supporting this frame for mobility on a track, an undercarriage vertically adjustably mounted on this frame for selectively supporting the frame for mobility on the road, a track tractor including a second machine frame, a single undercarriage capable of supporting the truck tractor for mobility on the road, a drive for moving the machine, tools mounted on the machine for track maintenance, a transversely extending, horizontal pivot linking the facing machine frame ends and arranged between the undercarriages supporting the first machine frame and the truck tractor for mobility on the road, and a power drive vertically adjustably connecting the truck tractor and the first machine frame and supporting the truck tractor on first machine frame in a vertically adjusted position.

11 Claims, 3 Drawing Figures

ON-TRACK, OFF-TRACK TRACK MAINTENANCE MACHINE

The present invention relates to an on-track, off-track track maintenance machine, such as a track leveling and tamping machine, comprising a first machine frame, undercarriages capable of supporting the first machine frame for mobility on a track, an undercarriage vertically adjustably mounted on the first machine frame for selectively supporting the first machine frame for mobility on a road, a truck tractor including a second machine frame, the machine frames having facing ends, an undercarriage capable of supporting the track tractor for mobility on the road, a drive means for moving the machine, and tool means for track maintenance.

A track leveling and tamping machine of this type is disclosed in U.S. Pat. No. 4,103,622, dated Aug. 1, 1978. This machine comprises a truck tractor with two undercarriages capable of supporting the truck tractor on the road and the relatively heavy machine frame of the leveling and tamping machine has a projecting end which may be coupled to the fifth wheel frame of the tractor. Further, this projecting frame end carries a vertically adjustable support jack and, at the opposite end of the machine frame but within its wheel base, an undercarriage capable of selectively supporting the machine frame on the road remains lowered until the machine frame is so aligned with the track that the wheels of the undercarriages capable of supporting the machine frame on the track are in registry with the track rails. The support jack is then lowered to support the machine frame on the ballast bed and to disengage the projecting frame end of the fifth wheel frame of the tractor. The support jack and the undercarriage capable of selectively supporting the machine frame on the road are then retracted whereby the wheels are lowered into engagement with the track rails. This on-track, off-track ballast tamping machine has been very efficient in operation in connection with relatively large leveling, lining and tamping machines which are to be moved over large distances from one operating site to another.

Published German patent application No. 2,554,463, published June 8, 1977, discloses a rail guide arrangement for a road vehicle. Such arrangements are used particularly to transport road vehicles with their working tools from one site to another by rail. The arrangement comprises vertically adjustable on-track undercarriages projecting from the two ends of the road vehicle frame. A power drive enables each undercarriage to be lowered into engagement with the track rails, the wheels of the undercarriages being pressed against the rails by a part of the weight of the vehicle while the rest of the vehicle weight continues to rest on the undercarriages supporting the vehicle on the ground and serving to drive the vehicle along the track. Since the undercarriages at the ends of the vehicle frame may interfere with some work of the vehicle on the road, they must often be detached during road operations. Furthermore, the partial transfer of the vehicle load to the undercarriages which merely guide the vehicle along the track rails reduces the driving efficiency of the vehicle on the track.

It is the primary object of this invention to provide an on-track, off-track track maintenance machine of the first described type but which is particularly adapted to smaller, simpler and lighter machines, including light tampers, for their rapid and problem-free conversion from road to track, and vice versa.

This and other objects are accomplished according to the invention with a machine whose track tractor has a single undercarriage capable of supporting the track tractor for mobility on the road and a transversely extending horizontal pivot linking the machine frame ends and arranged between the undercarriages supporting the first machine frame and the truck tractor for mobility on the road. A power drive vertically adjustably connects the truck tractor and the first machine frame and supports the truck tractor on the first machine frame in a vertically adjusted position.

This unexpectedly simple machine structure provides a single undercarriage capable of supporting the truck tractor for mobility on the road while another such undercarriage is retractibly mounted between the two undercarriages capable of supporting the first machine frame for mobility on the track. This interdigitating arrangement of the respective undercarriages provides a very simple, yet robust structure enabling ready conversion of the machine from track to road use, and vice versa, and very simple transportation on track or road. Since the relatively heavy first machine frame, which carries the track maintenance tools, has the track-bound undercarriages affixed thereto, which assures a good and solid guidance along the track, all the advantages of a track-bound machine are retained. On the other hand, all the advantages of a road vehicle are also retained in the combined machine when the track-bound first machine frame is coupled to a standard truck tractor by a suitably arranged pivot and the proper arrangement of the second undercarriage for selectively supporting the tractor for mobility on the road so that all traction and load forces are suitably distributed over the entire machine operation. The arrangement is particularly useful for smaller track maintenance machines because they retain optimal drive properties while meeting all operational requirements and maintain excellent stability.

The above and other objects, advantages and features of the present invention will become more apparent from the following detailed description of now preferred embodiments thereof, taken in conjunction with the accompanying, somewhat diagrammatic drawing wherein.

Figure 1:
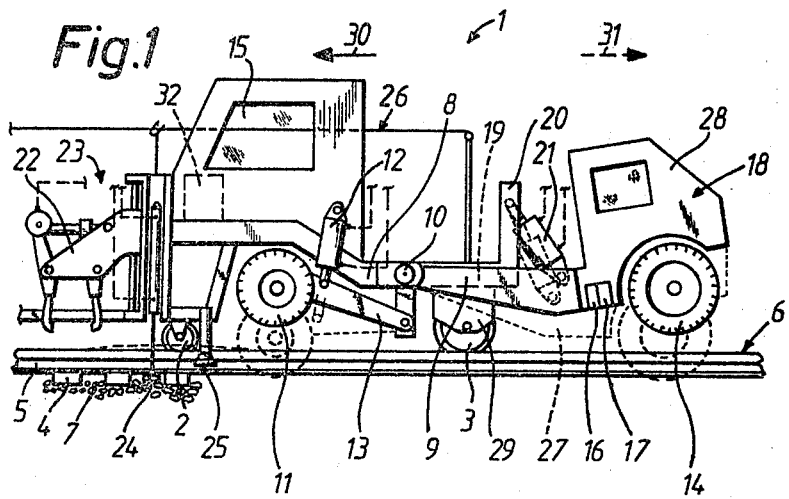
FIG. 1 is a side elevational view of a portion of an on-track, off-track track leveling and tamping machine according to one embodiment of this invention.
Figure 2:
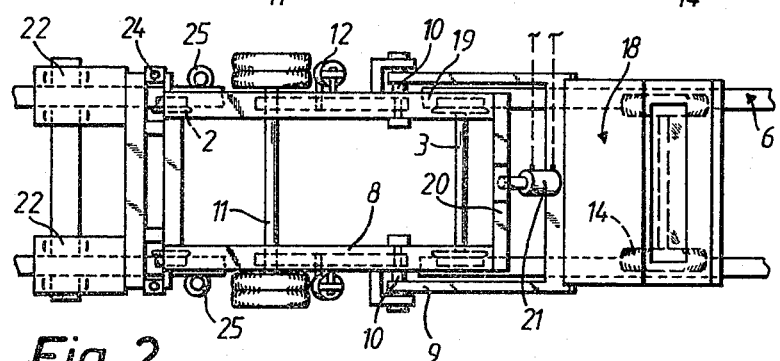
FIG. 2 is a partially schematic top view of the machine of FIG. 1, the operator's cab on the first machine frame being omitted to make essential structures visible.

Referring now to the drawing and first to FIGS. 1 and 2, there is shown track maintenance machine 1 comprising first machine frame 8 to which are affixed front undercarriage 2 and rear undercarriage 3 capable of supporting machine frame 8 for mobility on track 6 consisting of rails 5 fastened to ties 4 embedded in ballast 7. Undercarriage 11 is vertically adjustably mounted on first machine frame 8 for selectively supporting the first machine frame for mobility on a road. Carrier arms 13 vertically adjustably mount undercarriage 11 and the carrier arms are mounted on machine frame 8 on pivots extending transversely and horizontally to enable the undercarriage to be retracted into a rest position shown in full lines in FIG. 1 and to be lowered into an operating position shown in broken lines in FIG. 1. Power drives 12, illustrated as hydraulic jacks, link arms 12 to machine frame 8 for pivoting the carrier arms on the first machine frame between the rest and operating positions.

Truck tractor 18 including second machine frame 9 is coupled to first machine frame 8. Single undercarriage 14 capable of supporting the truck tractor for mobility on the road is affixed to the track tractor. Transversely extending, horizontal pivot 10, which extends parallel to the axles of the undercarriages, links the facing machine frame ends and is arranged between undercarriages 11 and 14 supporting first machine frame and the truck tractor on the road, the pivots mounting carrier arms 13 defining a substantially vertical plane with horizontal pivot 10 linking the machine frame ends.

The described and illustrated mounting of undercarriage 11 in relation to pivotal link 10 between the first and second machine frames assures an excellent distribution of the tress forces since these forces may be received directly by undercarriage 11 in the range of pivot 10. In addition, this particular arrangement makes a relatively simple vertical adjustment of undercarriage 11 possible, which is capable of sustaining considerable loads.

In the embodiment of FIGS. 1 and 2, first machine frame 8 has frame portion 19 projecting beyond pivot 10 and further comprises support 20 mounted on projecting frame portion 19. Power drive 21, which is illustrated as a hydraulic jack, is supported on support 20 and vertically adjustably connects truck tractor 18 and first machine frame 8 and supports the truck tractor on the first machine frame in a vertically adjusted position (shown in full in FIG. 1). In the illustrated embodiment, the cylinder of hydraulic jack 21 is linked to second machine frame 9 of the truck tractor and its chambers are connected to source 17 of hydraulic fluid carried by truck tractor 18. The piston rod of the jack is linked to vertical support 20. In this manner, the truck tractor may be lowered from its rest position shown in full lines in FIG. 1 to the operating position 27 indicated in broken lines in this figure.

The drive means for moving the machine includes drive 16 on truck tractor 18. First machine frame 8 and truck tractor 18 carry operator's cabs 15 and 28, respectively, and tool means 23 for track maintenance is arranged on the first machine frame. Pivot 10 is arranged between undercarriages 2, 3 capable of supporting the first machine frame for mobility on the track.

The described interrelationship and location of the pivotal link between the facing machine frame ends and the undercarriages, as well as the support for pivoting drive 21 produce a heavy on-track, off-track machine of great stability. The weight of the retracted truck tractor is transmitted to rear undercarriage 3 so as to increase the frictional engagement of its wheels with the track rails, which may otherwise be insufficient for properly driving the machine along the track in the direction of arrow 30 since the rear undercarriage is remote from track maintenance tool means 23 and, therefore, receives little of its weight, this weight being distributed primarily to front undercarriage 2. Thus, the machine is not only very stable but there is also a good drive force transmission assured to the wheels of undercarriages 2 and 3.

In the illustrated embodiment, the drive means for moving the machine also includes drive 29 connected to rear undercarriage 3. This undercarriage is arranged between undercarriages 11 and 14 capable of supporting first machine frame 8 and truck tractor 18 for mobility on the road, and undercarriage 3 is spaced farther from the center of gravity of first machine frame 8 than from the center of gravity of truck tractor 18. This arrangement is particularly useful for a track tamper whose tool means comprises tamping units 22 overhanging the machine frame since it permits a trouble-free mounting of the tamping units and the respective track and road undercarriages in series. The indicated spacing of driven undercarriage 3 assures a particularly stable structure on the track as well as on the road and whether the machine is self-propelled or driven in a train.

Figure 3:
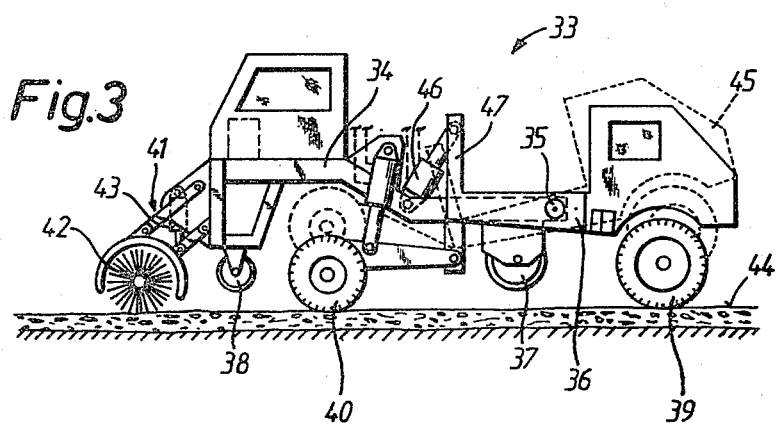
FIG. 3 is a side elevational view of another embodiment of an on-track, off-track track maintenance machine according to the invention.

If desired, tamping units may be replaceably mounted at the front end of machine frame 8 and may be replaced by a different track maintenance tool means 23, for example the broom arrangement illustrated in FIG. 3, so that the track maintenance machine may be used for various purposes in track maintenance operations.

The illustrated machine is used for leveling, for which purpose the tool means further comprises a track lifting unit which is shown as vertically adjustable track shoe 24 mounted on machine frame 8 outside each wheel of undercarriage 2 for supporting the machine frame on ballast 7 and rail clamps or hooks 25 adjacent thereto for engaging the track rails during the vertical adjustment of the track shoes. A leveling reference system 26 controls the operation of the vertical adjustment to lift the track to a desired level indicated by broken lines at 25.

As shown in FIG. 2, second machine frame 9 is substantially fork-shaped and holds the facing end of first machine frame 8 or, more particularly projecting frame portion 19, pivotal couplings 10 being mounted at the outer ends of the two lateral frame portions of frame 9 to link the truck tractor to machine frame 8. Hydraulic jack 21 is arranged centrally on the transverse frame portion of frame 9, as clearly illustrated in FIG. 2. This produces a secure, stable and substantially torsion-free connection between the first and second machine frames, and the forces generated by power drive 21 supporting the truck tractor in the lifted rest position on machine frame 8 during movement of the machine on track 6 is received by machine frame 8 without subjecting the same to any substantial torsion.

Track maintenance machine 33 of FIG. 3 comprises first machine frame 34 and a truck tractor including second machine frame 36. The facing machine ends are linked by pivot 35. As in the first-described embodiment, undercarriages 37 and 38 are affixed to the first machine frame for supporting the same for mobility on the track, single undercarriage 39 is affixed to the truck tractor for supporting the truck tractor for mobility on the road, undercarriage 40 is vertically adjustably mounted on first machine frame 34 for selectively supporting the first machine frame for mobility on the road, and hydraulic jack 46 vertically adjustably connects the truck tractor and the first machine frame and supports the truck tractor on the first machine frame in a vertically adjusted position. In this embodiment, however, second machine frame 36 has a frame portion projecting beyond pivot 35 and further comprises support 47 mounted on the projecting frame portion, power drive 46 being supported on support 47. Pivot 35 is arranged between rear undercarriage 37 capable of supporting machine frame 34 for mobility on the track and single undercarriage 39 capable of supporting the truck tractor for mobility on the road.

This structure, too, provides a very stable machine wherein first machine frame 34 serves as the main carrier receiving the various stresses exerted upon the machine during operation and conversion from road to track use, and vice versa. The machine may readily use an existing track maintenance machine and a standard truck tractor, adding to the former vertically adjustably mounted undercarriage 40 and adding to the latter support 47. The two frames are then coupled together by pivot 35 and power drive 46 is added to complete the machine. The illustrated positioning of pivot 35 will add to the stability of the structure.

The operation of the machine will be evident from the above description of its structure and will be more fully set forth hereinbelow in connection with the track tamping and leveling machine of 1 and 2:

The machine is shown in FIG. 1 in operation on track 6, for which purpose jacks 12 and 21 have been operated to retract undercarriages 11 and 14. While the machine is driven in operating direction 30 by drive 29 from tie to tie, the track is lifted by track lifting units 24, 25 to desired level determined by reference system 26 and the ballast is tamped under ties 4 by tamping units 22 to fix the lifted track in the leveled position. If the machine is to be moved to another operating site nearby, it may be driven on the track by drive 29. However, if it is to be moved a relatively long distance and/or if the track is to be freed for train traffic, machine 1 may be taken off the track and moved on a road on undercarriages 11 and 14. For this purpose, it may be preferred, if possible, to move the machine to a flat track crossing although this is not absolutely necessary. To take the machine off the track, power drives 12 and 21 are operated to lower undercarriages 11 and 14 until the tired wheels of these undercarriages engage the ground, causing first machine frame 8, with its undercarriages 2 and 3, to be lifted off the ground. An operator in cab 15 or 28 may now move the machine in the direction of arrow 31 off the track and on a road, for which drive 16 of the truck tractor may be used. It may be desireable, as shown, to provide a source 32 of hydraulic fluid on machine frame 8 also and the track maintenance tool means may drive their power from this source.

Machine 33 is shown in FIG. 3 in an operating position on a road. Its conversion to track operation will proceed in a manner identical to that described hereinabove but, of course, in reverse order, i.e., undercarriages 39 and 40 will be retracted to enable the wheels of undercarriages 37 and 38 to engage the rails of a track. The illustrated machine is used to sweeping a road, for which one end of first machine frame 34 carries rotary broom 42 detachably and vertically adjustably mounted on the machine frame end by means of a parallelogram suspension 41 operated by hydraulic jack 43. Operation of jack 43 enables broom 42 to be pressed against a road surface or a ballast bed in a sweeping operation. The retracted position of undercarriages 39 and 40 is indicated in broken lines at 45.

Obviously, while ballast tamping and track leveling tool means have been shown in one embodiment and a rotary broom in the other embodiment, any type of track maintenance tool means may be mounted on the first or main machine frame of the on-track, off-track track maintenance machine of the present invention. The tool means may include not only track maintenance tools but also road maintenance tools.

What is claimed is:

1. An on-track, off-track track maintenance machine comprising
   (a) a first machine frame,
   (b) undercarriages capable of supporting the first machine frame for mobility on a track,
   (c) an undercarriage vertically adjustably mounted on the first machine frame for selectively supporting the first machine frame for mobility on a road,
   (d) a truck tractor including a second machine frame,
      (1) the machine frames having facing ends,
   (e) a single undercarriage capable of supporting the truck tractor for mobility on the road,
   (f) drive means for moving the machine,
   (g) tool means for track maintenance,
   (h) a transversely extending, horizontal pivot linking the machine frame ends and arranged between the undercarriages supporting the first machine frame and the truck tractor for mobility on the road, and
   (i) a power drive vertically adjustably connecting the truck tractor and the first machine frame and supporting the truck tractor on the first machine frame in a vertically adjusted position.

2. The on-track, off-track track maintenance machine of claim 1, wherein the first machine frame has a frame portion projecting beyond the pivot and further comprising a support mounting on the projecting frame portion, the power drive being supported on the support and the drive means includes a drive on the truck tractor for moving the machine.

3. The on-track, off-track track maintenance machine of claim 2, wherein the pivot is arranged between the undercarriages capable of supporting the first machine frame for mobility on the track.

4. The on-track, off-track track maintenance machine of claim 1, 2 or 3, further comprising carrier arms vertically adjustably mounting the undercarriage for supporting the first machine frame on the road, the carrier arms being mounted on the first machine frame on pivots defining a substantially vertical plane with the horizontal pivot linking the machine frame ends.

5. The on-track, off-track track maintenance machine of claim 4, further comprising power drives for pivoting the carrier arms on the first machine frame.

6. The on-track, off-track track maintenance machine of claim 1, wherein the second machine frame has a frame portion projecting beyond the pivot and further comprising a support mounted on the projecting frame portion, the power drive being supported on the support.

7. The on-track, off-track track maintenance machine of claim 6, wherein the pivot is arranged between one of the undercarriages capable of supporting the first machine frame for mobility on the track and the single undercarriage capable of supporting the truck tractor for mobility on the road.

8. The on-track, off-track track maintenance machine of claim 1, wherein the first machine frame and the truck tractor carry operator's cabs, one of the undercarriages capable of supporting the first machine frame for mobility on the track is spaced farther from the center of gravity of the first machine frame than from the center of gravity of the truck tractor, and the drive means includes a drive connected to the one undercarriage.

9. The on-track, off-track maintenance machine of claim 8, wherein the tool means comprises a ballast tamping unit, a track lifting unit and a reference system mounted on the first machine frame for leveling and tamping the track.

10. The on-track, off-track track maintenance machine of claim 8 or 9, wherein the power drive is a centrally arranged hydraulic drive.

11. The on-track, off-track track maintenance machine of claim 1, wherein the second machine frame is substantially forkshaped and holds the facing end of the first machine frame.

* * * * *

UNITED STATES PATENT AND TRADEMARK OFFICE
CERTIFICATE OF CORRECTION

PATENT NO. : 4,384,530
DATED : MAY 24, 1983
INVENTOR(S) : JOSEF THEURER

It is certified that error appears in the above-identified patent and that said Letters Patent are hereby corrected as shown below:

Cover page, [73] Assignee, change "Franz Plasser Bahnbaumas-Chinen-Industriegesellschaft m.b.H." to --Franz Plasser Bahnbaumaschinen-Industriegesellschaft m.b.H.--.

Signed and Sealed this

Eleventh Day of October 1983

[SEAL]

Attest:

GERALD J. MOSSINGHOFF

Attesting Officer            Commissioner of Patents and Trademarks